US011514395B2

(12) United States Patent
Natarajan et al.

(10) Patent No.: US 11,514,395 B2
(45) Date of Patent: Nov. 29, 2022

(54) SYSTEM FOR COST EFFICIENT ORDER FULFILLMENT

(71) Applicant: Target Brands, Inc., Minneapolis, MN (US)

(72) Inventors: Kumaran Malli Natarajan, Minneapolis, MN (US); Nicholas Kaiser, Minnetonka, MN (US); Elise Chianelli, Brooklyn Park, MN (US); Vinay Patil, Minnetonka, MN (US)

(73) Assignee: Target Brands, Inc., Minneapolis, MN (US)

( * ) Notice: Subject to any disclaimer, the term of this patent is extended or adjusted under 35 U.S.C. 154(b) by 321 days.

(21) Appl. No.: 16/160,648

(22) Filed: Oct. 15, 2018

(65) Prior Publication Data
US 2020/0118074 A1    Apr. 16, 2020

(51) Int. Cl.
*G06Q 10/08*    (2012.01)
*G06F 16/23*    (2019.01)

(52) U.S. Cl.
CPC ..... *G06Q 10/0838* (2013.01); *G06F 16/2365* (2019.01); *G06Q 10/087* (2013.01); *G06Q 10/08345* (2013.01)

(58) Field of Classification Search
CPC ............. G06Q 10/083; G06Q 30/0635; G06Q 10/087; G06Q 10/0832; G06Q 10/0833; G06Q 10/08345; G06Q 10/08355; G06Q 50/28; G06Q 10/00; G06Q 10/06; G06Q 10/063114; G06Q 10/08; G06Q 10/0838; G06Q 30/0282; G06Q 10/06315
See application file for complete search history.

(56) References Cited

U.S. PATENT DOCUMENTS

| | | | | |
|---|---|---|---|---|
| 9,747,346 | B1* | 8/2017 | Liu | G06Q 30/0259 |
| 10,592,964 | B2* | 3/2020 | High | G06Q 30/0635 |
| 2005/0261991 | A1* | 11/2005 | Kennamer | G06Q 10/08 705/28 |
| 2012/0296704 | A1* | 11/2012 | Gross | G06Q 30/02 |
| 2014/0129391 | A1 | 5/2014 | Kreuels et al. | |
| 2014/0278627 | A1 | 9/2014 | Grabovski et al. | |
| 2014/0279294 | A1* | 9/2014 | Field-Darragh | G06Q 30/0282 705/28 |
| 2015/0127412 | A1 | 5/2015 | Kothandaraman et al. | |
| 2016/0371629 | A1 | 12/2016 | Agrawal et al. | |
| 2017/0075962 | A1* | 3/2017 | Hitchcock | G06Q 50/28 |
| 2017/0287052 | A1* | 10/2017 | High | G06Q 10/083 |
| 2018/0197137 | A1* | 7/2018 | High | G06Q 30/0202 |
| 2018/0240181 | A1* | 8/2018 | Lopez | G06Q 10/0833 |
| 2020/0057992 | A1* | 2/2020 | Neumayer | G06Q 10/0834 |
| 2020/0097908 | A1* | 3/2020 | Glasfurd | G06N 5/046 |

OTHER PUBLICATIONS http://www.murrayrice.com/uploads/1/2/9/6/12967989/esri_-_improving_retail_performance.pdf (Year: 2012).*

* cited by examiner

*Primary Examiner* — Ariel J Yu
*Assistant Examiner* — Dana Amsdell
(74) *Attorney, Agent, or Firm* — Merchant & Gould P.C.

(57) ABSTRACT

A computer-implemented method for determining cost efficient order fulfillment system. A list of items is received in a purchase order for delivery. A quality score comprising a shipping history score, an inventory accuracy score, and a handling score is calculated for each retail location. The retail location with the lowest cost and the highest quality score is selected to ship the order.

22 Claims, 8 Drawing Sheets

SYSTEM FOR COST EFFICIENT ORDER FULFILLMENT

BACKGROUND

There are two basic methods for purchasing items. In the first method, the purchaser goes to a store, selects the item they want, purchases the items and takes the items back with them. In the second method, the purchaser submits an order for the item(s), the vendor packages the item and ships it to the purchaser. Packaging and shipping all the items in an order is referred to as fulfillment of the order. Packaging of the items is often referred to as handling and can include selecting the items from shelves or other containers, placing the items in boxes or other shipping containers, and placing a shipping label on the shipping structure(s) that will allow a carrier to deliver the shipping structure(s) to the proper destination.

Accordingly, it is desirable to provide customers with prompt shipping and a high quality shipping service.

SUMMARY

In general, methods and systems for fulfilling an order from a retail location are described. The methods and systems described herein generate models based on previous item selection and item shipment to determine an overall quality score that is determined, at least in part, on a shipping history score, an inventory accuracy score, and a handling score.

In particular, in a first aspect, a method for determining a fulfillment retail location is described. The method includes receiving inputs related to an order comprising an inventory item and a destination location at a software tool implemented on a computing system; receiving a request for delivery of the order; determining, individually for the inventory item, one or more retail locations from which the inventory item can be delivered to a destination location within a predetermined period of time; determining, individually for the one or more retail locations, a quality score, wherein the quality score is based at least in part on one or more of a shipping history score, an inventory accuracy score, and a handling score; and based on the quality score being above a predetermined quality score threshold, selecting a retail location from among the one or more retail locations with the highest quality score and shipping the inventory item from the retail location.

In another aspect, a system for facilitating online orders fulfilled from retail locations is described. The system includes a computing system comprising at least one processor communicatively connected to a memory, the memory storing computer-executable instructions comprising a software tool which, when executed causes the computing system to execute the following: receive a request for delivery of the order; determine, individually for the inventory item, one or more retail locations from which the inventory item can be delivered to a destination location within a predetermined period of time; determine, individually for the one or more retail locations, a quality score, wherein the quality score is based at least in part on one or more of a shipping history score, an inventory accuracy score, and a handling score; and based on the quality score being above a predetermined quality score threshold, selecting a retail location from among the one or more retail locations with the highest quality score and shipping the inventory item from the retail location.

In yet another aspect, a retail web server configured for facilitating online orders fulfilled from retail locations is described. The retail web server comprises a computing system comprising at least one processor communicatively connected to a memory, the memory storing computer-executable instructions comprising a software tool which, when executed cause the system to perform the following steps. First, provide a retail use interface from an online retailer, the retail user interface including a plurality of selectable items available for delivery to a user, then, receive from a user device a selection of an item from among the plurality of selectable items and a destination location for delivery of the item within a predetermined period of time, transmit the selection of the item and the destination location to a delivery management system comprising a quality assessment server, and receive, from the quality assessment server, a quality score, wherein the quality score is based at least in part on one or more of a shipping quality score, an inventory accuracy score, and a handling score. Based on the quality score being below a predetermined quality score threshold, not selecting the retail location to ship the inventory item; and based on the quality score being above a predetermined quality score threshold, selecting a retail location from among the one or more retail locations with the highest quality score and shipping the inventory item from the retail location.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present invention are directed to predicting relevant items to be presented to a user in an online environment. The methods and systems described herein generate models based on previous item selection and item shipment to determine an overall quality score that is determined, at least in part, on a shipping history score, an inventory accuracy score, and a handling score.

Referring to FIGS. 1-8 generally, it is noted that there are a number of advantages over existing systems provided by the above methodology for determining which location or locations will ship an item for order fulfillment. In an example embodiment, a customer places an online order (or an order requiring delivery) containing at least one item. The system determines which location is the least cost shipment location and also determines whether or not that location meets the quality score threshold. If the location does not meet the quality score threshold, the system chooses the next location in the least cost shipment location list. If the location meets the quality score threshold, then that location ships the item(s).

When it is possible to distribute products from several different shipping locations, finding the lowest cost combination of shipping locations may not take into consideration the quality of handling the items and the quality of the items themselves. Embodiments described below provide methods and machines for improving the functionality of computing devices when determining what location should be used to ship items in order to fulfill a purchase order. In the embodiments, the location(s) that have the item in stock are located. A quality score is calculated for each location, which takes into consideration the shipping history of the location, the inventory accuracy of the location, and the handling history of the location. A threshold quality score is also determined, which represents the lowest quality score required for a retail location to be chosen to ship the items. The location with the least-cost shipping total and that meets the threshold is selected to ship the item.

Figure 1:
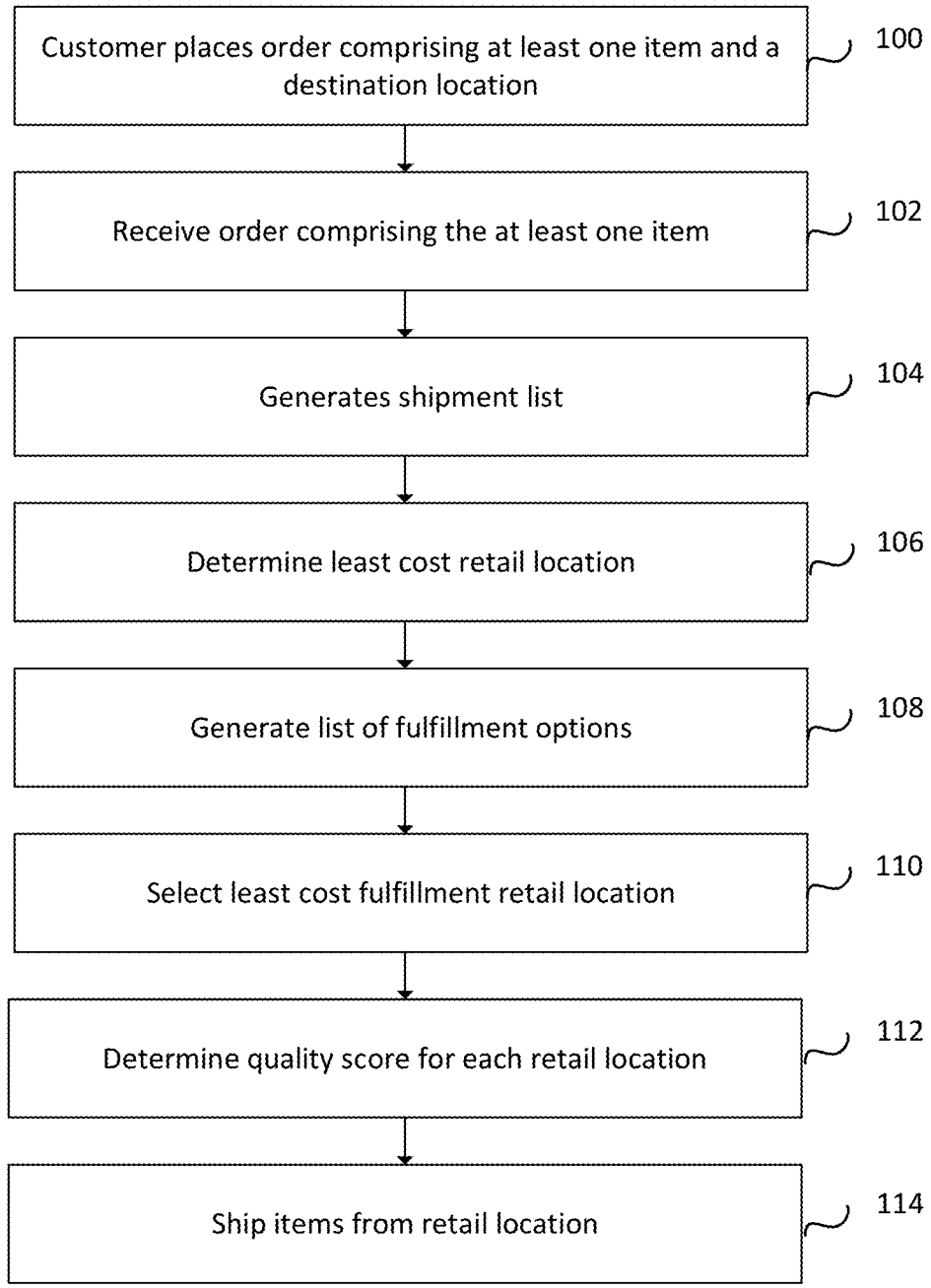
FIG. 1 provides a flow diagram of a method of identifying a set of locations from which to ship items in an order.
Figure 2:
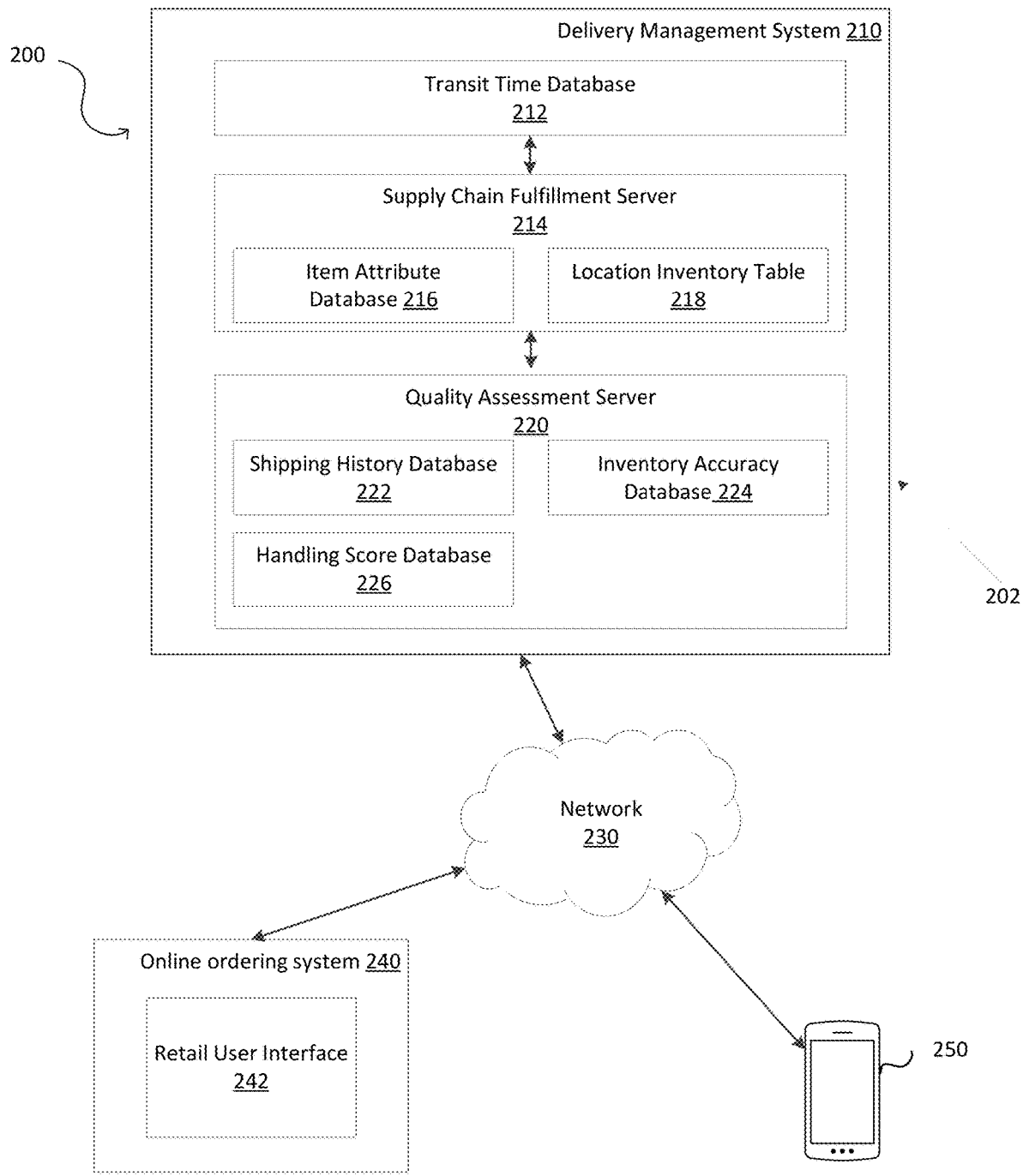
FIG. 2 illustrates an example block diagram of a computing system usable in the delivery management system.

FIG. 1 provides a flow diagram of a method of fulfilling an order while FIG. 2 provides a block diagram of a computing system 200 used to perform the method of FIG. 1. At step 100 of FIG. 1, a purchaser uses a mobile device 250 (other devices may be used to access the online ordering system 240) to submit an order containing a list of items and a destination location 310. Mobile device 250 transmits order through network 230 to an online ordering system 240, which receives the order at step 102 and stores the list of items as an order and destination location 310 as ship-to address. In an order, all of the items are to be shipped to the same destination location indicated by ship-to address. At step 104, a shipment generator in an online ordering system 240 generates a shipment list from the order.

At step 106, a transit time database 212 in conjunction with a supply chain fulfillment server 214 produces a shipment list with least cost retail locations 304, 306, 308. In particular, supply chain fulfillment server 214 determines which location can ship each shipment at the least cost. Thus, each shipment in shipment list has an associated location, such as a retail location that can ship the shipment at the lowest cost. The process for determining the least cost shipping location and its associated cost for each shipment is described further below.

At step 108, a transit time database 212 and supply chain fulfillment server 214 generates a list of fulfillment options and fulfillment costs using the shipment list with least cost retail locations 304, 306, 308. At step 110, a delivery management system 210 uses fulfillment options and costs to identify a least cost fulfillment option. The process of steps 108 and 110 are described further below. At step 112, a quality score is calculated for each retail location, as described in more detail below. At step 114, a delivery management system 210 uses least cost fulfillment option to instruct one or more locations, such as retail locations 304, 306, 308 to ship items to the destination location 310. Although only a limited number of locations are shown, those skilled in the art will recognize that any number of locations may be used.

FIG. 2 illustrates a schematic diagram of an overall system 200 for determining which location (or locations) is best at fulfilling an order. In an example, a customer selects at least one item, and the delivery management system 210 determines which store can ship the item(s) for the least cost while also meeting the minimum threshold quality score. Economic viability of shipping speeds may be used by the retailer to determine how quickly the item or items can be shipped to the destination location 310. A minimum threshold quality score as determined by the quality assessment server 220 ensures that the retail location shipping the items or items provides a high quality product and handling of the product.

Components of the overall system 200 includes a computing system 202, network 230, and an online ordering system 240. Together, the components determine which retail location should be used to fulfill a purchase order.

Components of the computing system 202 includes a delivery management system 210, which includes a transit time database 212, a supply chain fulfillment server 214, and quality assessment server 220. The transit time database 212 and a supply chain fulfillment server 214 operate to determine where an inventory item is located, what the transit time is to transport the item from a retail location 304, 306, 308 to a destination location 310, and which retail location is most likely to provide the highest quality shipping.

The transit time database 212 is useful in determining what shipping options are available for a particular item to a specified destination location 310. In an embodiment, the most economical and highest quality shipping option is selected. For example, if the quickest shipping speed is offered from a specific retail location, but that retail location does not meet the quality score threshold, then that retail location is not chosen to ship the item(s).

The transit time database 212 predicts the transit time of an item from a retail location 304, 306, 308 to a destination location 310. The transit time database 212 balances predicted transit times with current transit times determined by current events. Predicted transit times may be determined from past deliveries and a standard delivery time, in an ideal environment. An ideal environment does not have any mitigating factors, and represents the quickest time an item could be delivered. Mitigating factors includes things that affect transit times, such weather conditions, natural disasters, road construction, and traffic delays. For example, a weather event such as a flood may drastically affect transit times.

The transit time database 212 stores information about transportation equipment, transit times, delivery schedules, personnel, and outside contractors. The transportation equipment includes trucks, trailers, and other delivery equipment. Personnel information includes data for available personnel to staff the transportation equipment, cost of using internal personnel, and cost of hiring outside contractors.

The transit time database 212 also stores information related to transit times for movement of an item from a plurality of retail locations to a destination location 310. Transit times are determinate based on the item characteristics, as some items may need to additional lead-time for transport (i.e., hazardous or flammable materials).

All the factors used by the transit time database 212 are used to determine the economic feasibility of specified delivery times. Costs to deliver an item to different destination locations 310 differ. Therefore, the same item may be presented with different delivery options to customers who have different destination locations 310.

The supply chain fulfillment server 214 accesses information about the selected item from an item attribute database 216 and a location inventory table 218. Item attributes include all information about the item, including, but not limited to information that affects transit time. Item attributes include features such as whether particular items need to be temperature controlled (e.g. freezer), whether the items contain hazardous materials and require special handling, whether the items are flammable, the items' dimensions and weights, whether the items are bulky, etc.

The supply chain fulfillment server 214 accesses information in the item attribute database 216 to select proper transportation equipment for conveying the required items to the destination location 310. Transportation equipment is selected based on the attributes of the items as well as cost, availability, etc. The system schedules deliveries of shipments and executes delivery services tailored to each node and destination location 310. To schedule the transportation of inventory, the system selects a carrier service based on the expected transit times and transit expenses.

The delivery management system 210 in combination with the item attribute database 216 determines which types of transportation equipment are needed to transport the ordered items from the vendor to the warehouse. For example, the equipment may need to handle hazardous items or temperature sensitive items. In addition, the equipment must be sized appropriately to handle the size of the item and the number of items that are delivered. In some instances, the equipment may be scheduled for more than one pick-up, so the equipment must be compatible with all of the items that it is scheduled to pick up.

An item attribute database 216 stores information about attributes of the items or products that are being shipped and sold within the supply chain. Attributes of the products include weight, volume, units, and whether particular handling is required. Special handling may be required for items that require refrigeration, items that are flammable, or other hazardous materials in items. The delivery management system 210 relies on information in the item attribute database 216 to select equipment for transporting items.

The location inventory table 218 uses a collection of local inventory tables to determine whether a retail location has a particular item. Location inventory tables 218 include a separate inventory table for each retail location. Each location inventory table includes an item identifier, an item cost, an item handling cost, and a number of items. Item identifier identifies the item and item cost represents the cost of the item at the location. Item handling cost is the cost for preparing the item for shipment from the location and number of items is how many of this item are at the retail location. Each retail location inventory table inventory table is produced based on information provided by each of the retail locations, such as retail locations through network 230 and a network interface on server. For each item, a list of retail locations that have at least one of the item in inventory is created.

The quality assessment server 220 is used to calculate a quality score on a per-location basis. The quality assessment server 220 includes a shipping history database 222, an inventory accuracy database 224, and a handling score database 226. Quality assessment server 220 generates a list of fulfillment options and determines a quality score for each of the retail locations. Retail location quality measures how well a particular retail location is poised to fulfil an order. A retail location's past performance when fulfilling and delivering orders is used to predict a retail location's quality. Example retail location quality factors include maintaining accurate inventory levels and providing quality products. Quality products are products that are reliably picked, packed, and shipped undamaged.

In an embodiment, a quality score is calculated on a per-item basis. In another embodiment, a quality score is calculated on a per-category basis. For example, a quality score may be determined for all car seats/booster seats. In yet another embodiment, a quality score is calculated on a per retail location basis. A quality score is determined for each retail location 304, 306, 308, which is an average of quality scores for each item, or an average of quality score for each category.

Shipping history database 222 stores historical information for items each retail location has shipped. Specifically, shipping history database 222 is determined, at least in part, how often a retail location ships items out on time and how often the item is received at the destination location on time. Shipping history database 222 also calculates the cost of previous shipments and determines if and when the least cost shipping option was utilized. For example, if a retail location 304, 306, 308 always ships items on time, and the least cost shipping option is used, then a retail location has a 100% shipping history score. In another example, if a retail location ships items on time half the time, but always uses the least cost shipping option, then the retail location has a 75% shipping history score.

Inventory accuracy database 224 stores historical information of reported inventory levels for each retail location. Specifically, inventory accuracy database 224 calculates how accurate each retail location is at reporting inventory levels for each item in their inventory. For example, if a retail location 304, 306, 308 always maintains accurate inventory levels that the retail location has a 100% inventory accuracy score. If a retail location 304, 306, 308 maintains accurate inventory levels half the time, then that retail location receives a 50% inventory accuracy score.

Handling score database 226 stores historical information about how well a location handles items for shipping. Handling includes such factors as properly packaging the item, including all items in the order, and shipping high quality products. A high handling score represents a retail location that properly packages all items in the order, and ships a high quality product. A low handling score represents a retail location that does not properly package items, such as not properly securing fragile items, or not including all items in the order.

Quality assessment server 220 calculates a quality score used to predict how well a specified retail location is at shipping and handling items. In an example, the quality score is an average of the shipping history score, inventory accuracy score, and handling score. In another embodiment, the shipping history score, inventory accuracy score, and handling score are weighted differently.

The online ordering system 240 is connected to the computing system 202 through a network 230. The online ordering system 240 comprises a retail user interface 242, which a customer accesses though a mobile device 250. The online ordering system 240 includes a retail user interface 242, which customers use to order items.

In the embodiment shown, the online ordering system 240 receives information from a customer including a destination location 310 and at least one selected item. In some embodiments, the delivery management system 210 communicates with the online ordering system 240 through a network 230. The network 230 can be any of a variety of types of public or private communications networks, such as the Internet. The mobile device 250 can be any network-connected device including desktop computers, laptop computers, tablet computing devices, smartphones, and other devices capable of connecting to the Internet through wireless or wired connections.

Figure 3:
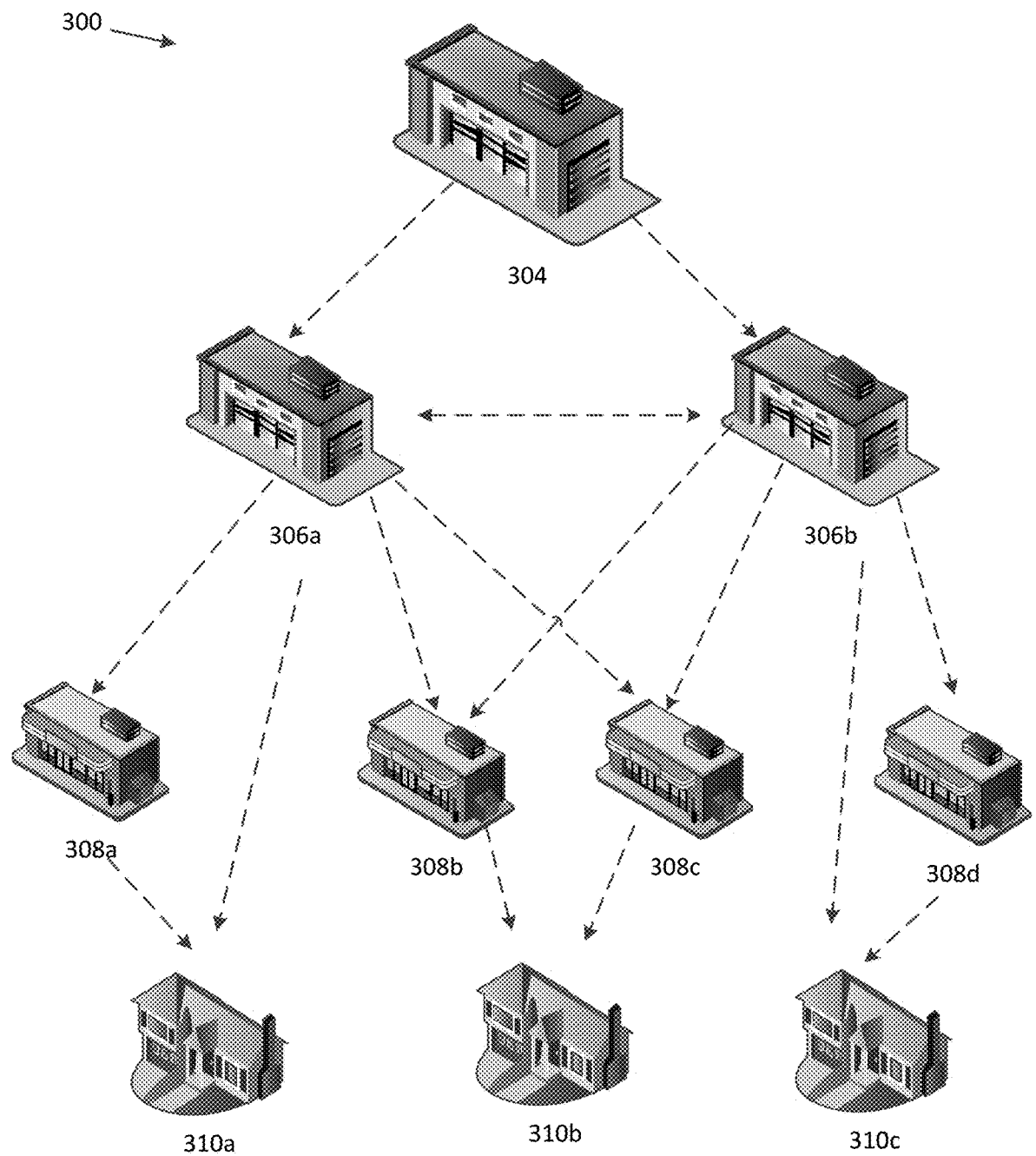
FIG. 3 illustrates a schematic diagram of an example supple chain for a retail enterprise.

FIG. 3 illustrates a schematic diagram 300 of an example supply chain for a retail enterprise. A retail enterprise may be an online retailer or a brick-and-mortar retailer with an online presence. The diagram 300 illustrates the flow of inventory from a node to a destination location 310. The inventory moves through various nodes to arrive at the customer. In this example, the nodes include a receive center 304, two flow centers 306a, 306b, four retail stores 308a, 308b, 308c, 308d, and three destination locations 310a, 310b, 310c, collectively referred to as retail locations. In practice, the supply chain could include many more nodes in different proportions. In some embodiments, there are not separate receive centers and flow centers 306. Instead, there may be one type of warehouse or distribution center for holding inventory before distributing to stores and customers. Arrows in the diagram indicate movement of inventory. Inventory will typically flow downward through the supply chain, but in some instances inventory may move between flow centers 306 or between retail stores 308. In some embodiments, inventory may even move from a flow center 306 to a receive center 304 or from a retail store 308 to a flow center 306. Once at the receive center 304, the products are prepared for transportation to one or more flow centers 306 or destination locations 310.

A variety of products is prepared for shipment to one or more flow centers 306. The flow centers 306 are typically positioned to enable quick shipment to one or more retail stores 308. Each flow center 306 may supply inventory to multiple retail stores 308. In some instances, more than one flow center 306 will send inventory to a retail store 308. For example, flow center 306a distributes inventory to stores 308a, 308b, and 308c. Flow center 306b distributes to stores 308b, 308c, and 308d. In the example of FIG. 3, products are shipped directly from flow center 306a to a destination location 310a and from flow center 306b to destination location 310c.

Depending on the location of a customer ordering products online, the shipments of products could come from one or more retail stores 308, or flow centers 306. For instance, the customer could receive shipments of products from either store 308b or store 308c, or both (in the instance of a multi-item purchase) at the destination location 310.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders. Regardless of the application, the systems and methods described herein provide the most benefit when determining which location is best suited to ship the items.

Figure 4:
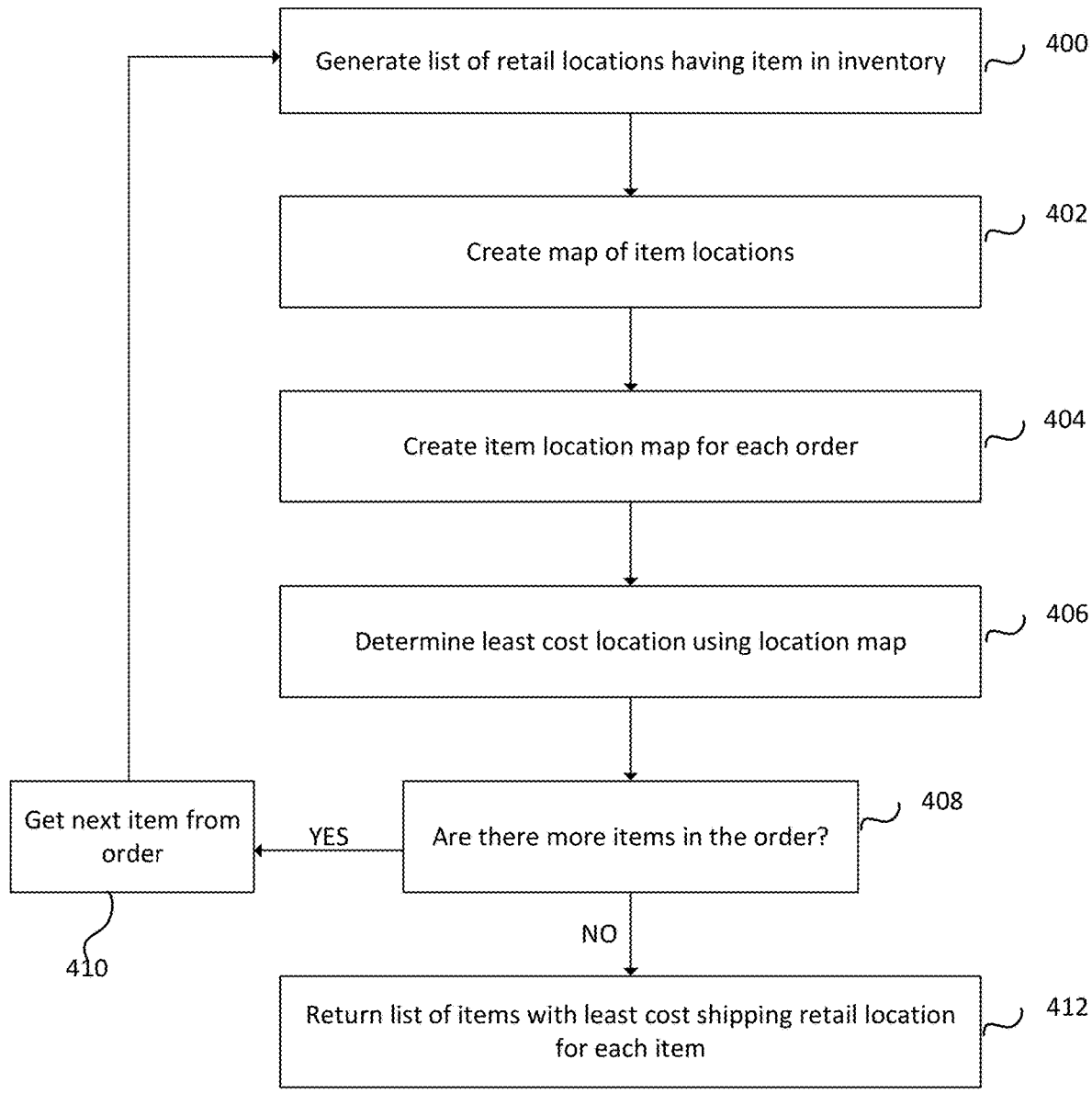
FIG. 4 provides a flow diagram of a method of determining a least cost and a least cost shipping location for each item in a shipment list.

FIG. 4 provides a flow diagram of a method of determining the least cost and least cost shipping location for each shipment. At step 400, for each item in an order, least cost location identifier identifies the locations that have the item in inventory. In accordance with some embodiments, least cost location identifier uses a collection of location inventory tables to determine whether a location has a particular item. Location inventory tables include a separate inventory table for each retail location. Each location inventory table includes an item identifier, an item cost, an item handling cost, and a quantity of items. Item identifier identifies the item and item cost represents the cost of the item at the location. Item handling cost is the cost for preparing the item for shipment from the location and number of items is how many of this item are at the location. Each inventory table is produced based on information provided by each of the locations, such as retail locations 304, 306, 308 through network 230 and a network interface on a server. In step 400, least cost location identifier searches every location inventory table for the item identifier of each item in item list. For each item, a list of retail locations 304, 306, 308 that have at least one of the item in inventory is created.

At step 402, a location-item map is formed from the lists of retail locations that have each item. In particular, for each retail location that has at least one item in item list, a list of all of the items in item list that are found at that retail location is created at step 402.

At step 404, least cost location identifier creates a location map that provides a list of retail locations for each item in the order, where each retail location in the list of retail locations has all of the items in the shipment.

Figure 5:
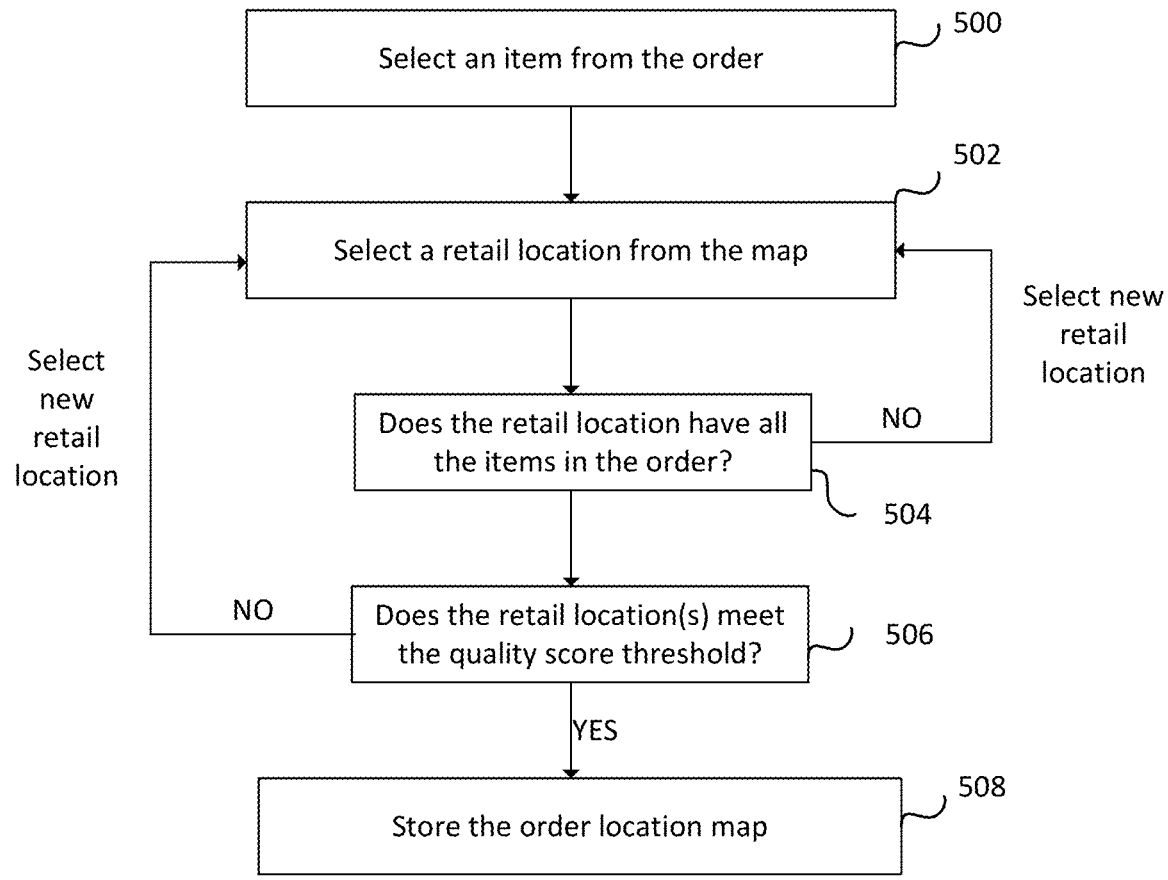
FIG. 5 provides a flow diagram for creating a shipment-location map.

The process of step 404 is shown in the flow diagram of FIG. 5. At step 500, a shipment is selected from shipment list. At step 502, a retail location is selected from location-item map. At step 504, least cost location identifier determines if the selected retail location has all items required by the selected shipment. If the retail location has all of the items for the shipment, the retail location is added to the shipment-location list for the shipment. If the retail location does not have all the items of the shipment selected at step 500, then a new retail location is selected and step 502 is repeated for the next retail location.

The, it is determined if the retail location(s) meets the quality score threshold at step 506. If the retail location does not meet threshold, the next retail location is selected and step 502, 504, and 506 are repeated. When all of the items in the order have been processed, the method continues at step 508 where the shipment-location map is stored.

Returning to FIG. 4, when the least cost and the least cost retail location for the current shipment has been determined at step 406, the process continues at step 408 where it determines if there are more items in the order. If there are more items, the retail location is selected at step 412. When there are no more items in the order, the process of FIG. 4 continues by getting the next item from the order 410. The process then begins at step 400 again.

Figure 6:
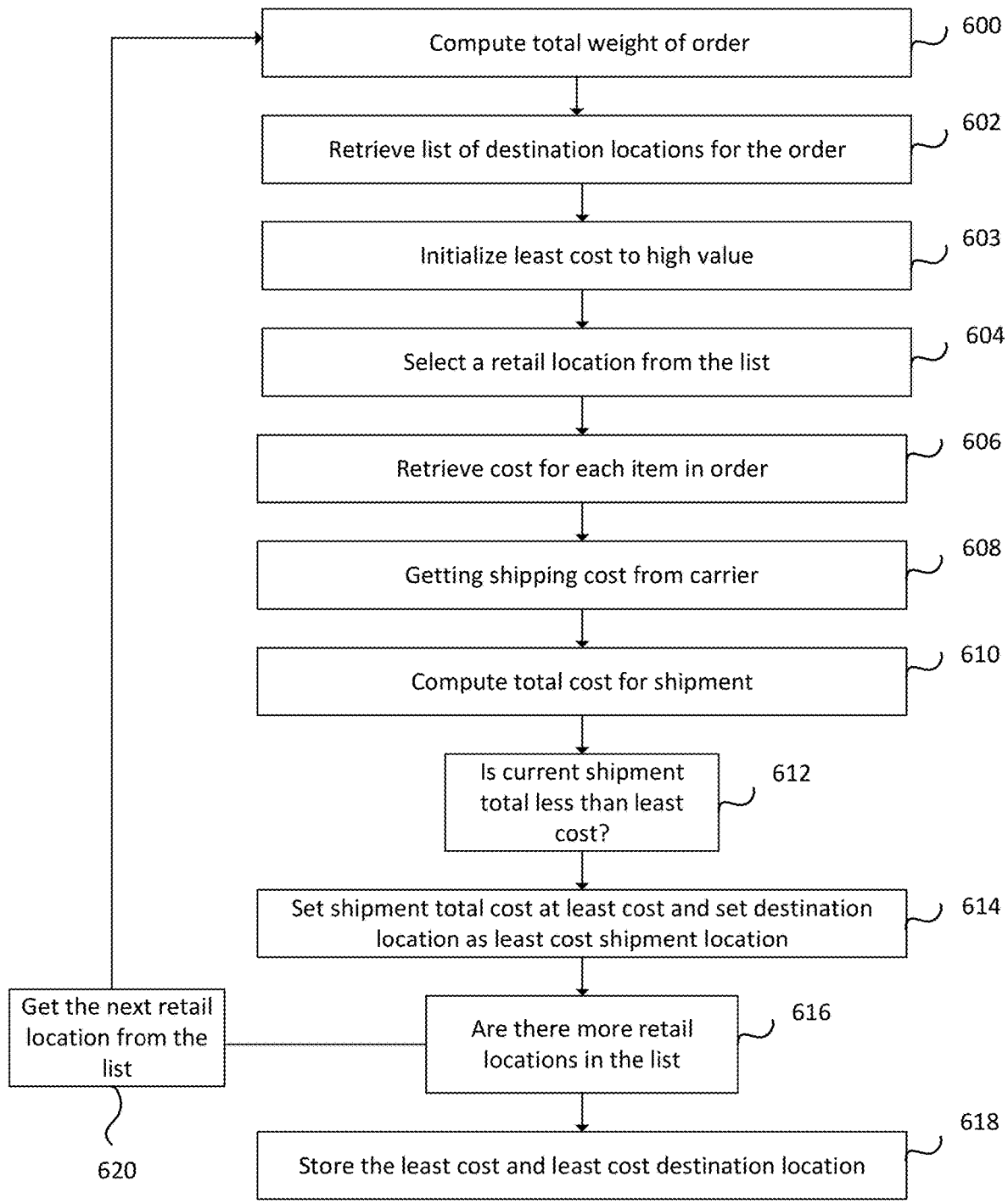
FIG. 6 is a flowchart for determining a least cost and least cost location for a single shipment.

FIG. 6 provides a flow diagram of a method of performing step 406. In step 600, the total weight of the shipment selected at step 406 is computed by adding together the weights of the items of the shipment. These weights can be retrieved from an item weight table (not shown) that contains an item identifier and a corresponding weight for each item. At step 602, a list of retail locations for the shipment is retrieved. At step 603, a least cost variable is set to an initial high value. This high value is selected to be higher than any anticipated cost for shipping the items.

At step 604, a retail location is selected from locations listed in a shipment-locations map for this shipment. At step 606, an item cost and an item handling cost are retrieved for each item in the shipment based on the retail location selected at step 604. In particular, the inventory table for the retail location is selected from inventory tables and the item cost and handling cost for each item in the shipment is retrieved from that table. At step 608, a carrier identifier from order is retrieved and the carrier is used to identify a shipping zone using a carrier zone table based on the destination location. Carrier zone table is part of a collection of carrier zone tables with one carrier zone table for each possible carrier. Each carrier zone table includes a ship-from zip code field, a ship-to zip code filed and a carrier zone. Ship-from zip code represents the retail location that will be shipping the items; ship-to zip code represents the zip code in ship-to address and carrier zone, represents a collection of shipping rates for various weights of items.

At step 608, a shipping cost is retrieved from a carrier rate table, which is one of a plurality of carrier rate tables. Carrier rate table includes a shipping zone, a weight, and a shipping cost. For each combination of a shipping zone and a weight, carrier rate table provides a corresponding shipping cost. Thus, using the weight determined at step 600 and the destination location determined at step 602, the rate can be retrieved at step 608 using carrier table.

At step 610, a total cost for the shipment for the retail location selected at step 604 is computed. This cost is referred to as an order fulfillment cost. In some embodiments, this cost includes just the shipping cost determined at step 608. In other embodiments, this cost is the sum of the handling cost of each item retrieved at step 606 added to the shipping cost determined at step 608. In still further embodiments, this cost is the sum of the item cost of each item in the shipment and the sum of the handling cost of each item in the shipment plus the shipping cost determined at step 608. The sum of the handling costs for the items in the shipment represents a handling cost for preparing the shipment for shipping from the location.

At step 612, the current shipment's total cost is compared to the current value of the least cost variable. If the current shipment's total cost is not less than the value of the least cost variable, the process continues at step 614 where it determines if there are more locations for this shipment. If there are more retail locations 616, the next retail location is retrieved 620 from map at step 604 and steps 606-612 are repeated for the new retail location. If the current shipment's total cost is less than the least cost variable at step 612, the shipment's total cost for the currently selected location is set as the value for the least cost variable and the current location is set as the least cost location for the shipment selected at step 406 of FIG. 4.

When there are no more retail locations in the shipment-location map for the current shipment, the process ends at step 618 and the least cost for this shipment and the least cost shipment location for this shipment are stored in shipment list with least cost locations.

Figure 7:
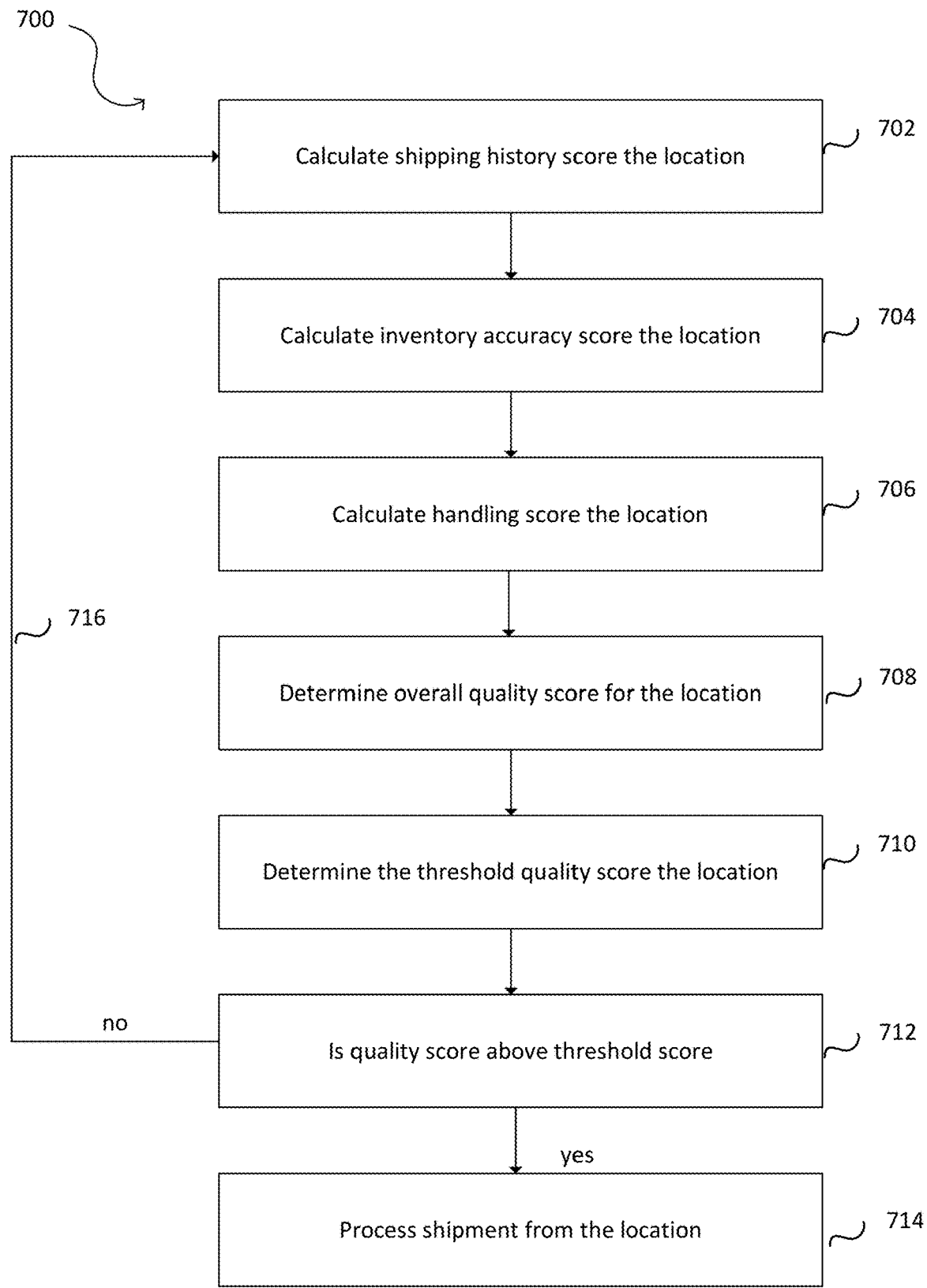
FIG. 7 is a flowchart for determining if a store quality store meets a threshold value.

FIG. 7 illustrates an example method 700 of determining whether a retail location has the minimum quality score to ship the item(s).

At step 702, the shipping history score of the retail location is determined. The shipping history score is calculated based on how often the retail location ships items on time and how often the item is received on time. A higher score represents a retail location that ships items on time and are received on time. The cost of shipping may also factor into the shipping history score. If the least cost shipping option is used, the retail location receives a higher shipping history score.

At step 704, the inventory accuracy score is calculated. The inventory accuracy score is calculated based on how often the retail location has accurate inventory. Retail locations that often have inaccurate inventory levels will have a low inventory accuracy score. Problems often arise when a retail location indicates that they have an item in stock, when it is not actually in stock. This ultimately causes a delay in shipping.

At step 706, a handling score for each retail location is calculated. The handling score takes into consideration the quality of shipments as well as the quality of the product. A high handling score is given to retail locations (and/or items) when the item is packaged correctly and arrives to the destination location unharmed. For example, an item that is fragile needs to be packaged in such a way that it arrives at the destination location without breaking. In another example, items that are packaged in appropriately sized packaging receive higher handling scores.

At step 708, an overall quality score is calculated. In an embodiment, the quality score is calculated on a per-item basis per retail location. In another embodiment, the quality score is calculated per retail location. In an embodiment, the quality score may be the average of the shipping history score, inventory accuracy score, and handling score. In another embodiment, one of the scores is weighted more heavily than the other scores. Quality scores can be calculated as a numeral range, for example from 1-100. A quality score of 100 is the highest score a retail location may receive.

At step 710, a threshold quality score is determined. The threshold quality score is a minimum score required for a retail location to be selected to ship the item. In yet another embodiment, a retail location needs to meet a threshold score in each of the categories: shipping history score, inventory accuracy score, and handling score.

At step 712, a determination of whether the retail location's quality score meets or exceeds the threshold score is determined. If the quality score meets or exceeds the threshold score, then the process proceeds to step 714 and the shipment is processed by that retail location. If the quality score does not meet the threshold score, then the process proceeds to step 716, where the method 700 begins again for a different retail location.

Figure 8:
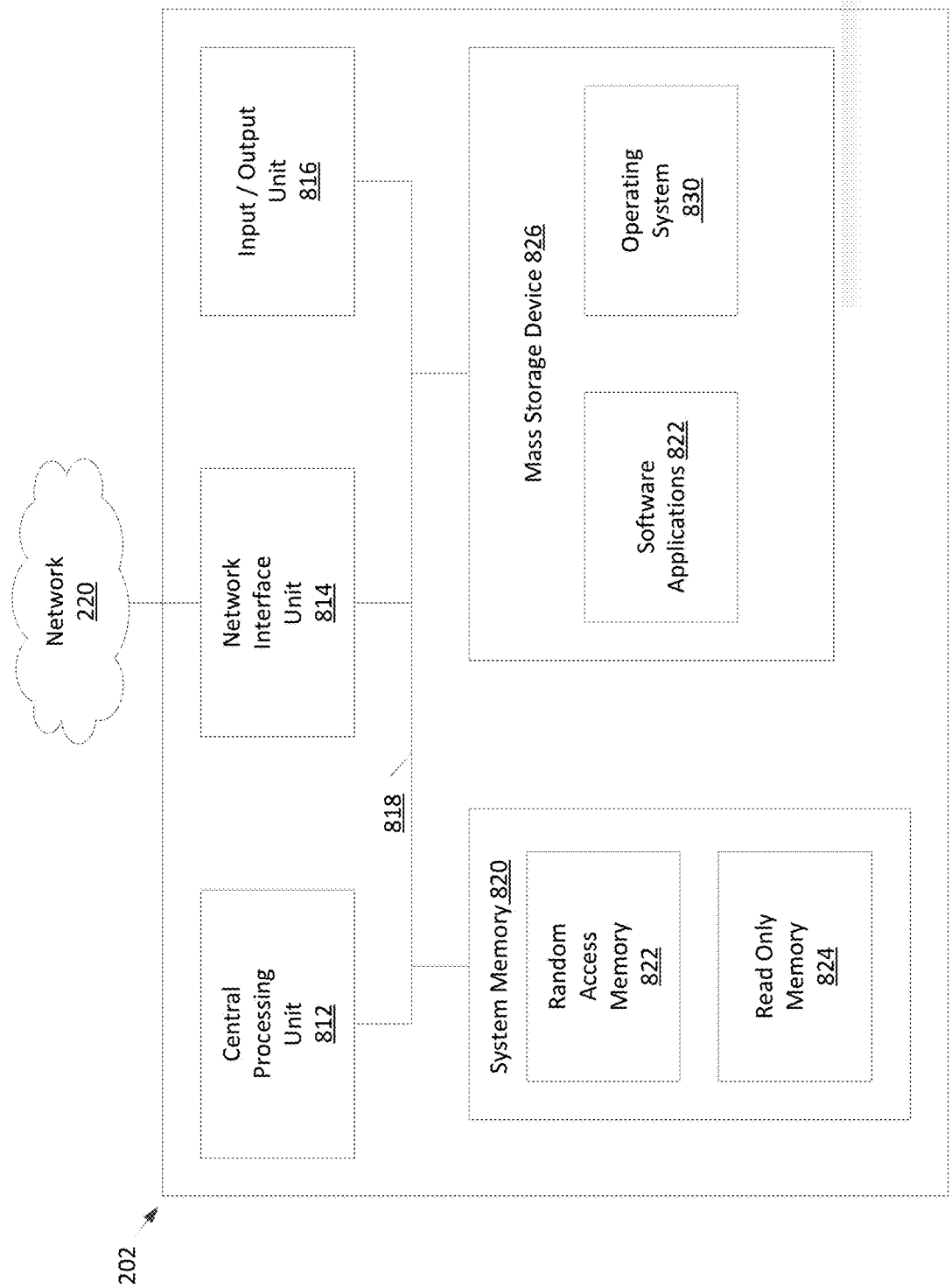
FIG. 8 illustrates an example block diagram of a computing system.

Referring now to FIG. 8, an example block diagram of a computing system 202 is shown that is useable to implement aspects of the delivery management system 210 of FIG. 2. In the embodiment shown, the computing system 202 includes at least one central processing unit ("CPU") 812, a system memory 820, and a system bus 818 that couples the system memory 820 to the CPU 812. The system memory 820 includes a random access memory ("RAM") 822 and a read-only memory ("ROM") 824. A basic input/output system that contains the basic routines that help to transfer information between elements within the computing system 202, such as during startup, is stored in the ROM 824. The computing system 202 further includes a mass storage device 826. The mass storage device 826 is able to store software instructions and data.

The mass storage device 826 is connected to the CPU 812 through a mass storage controller (not shown) connected to the system bus 818. The mass storage device 826 and its associated computer-readable storage media provide non-volatile, non-transitory data storage for the computing system 202. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 812 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 202.

According to various embodiments of the invention, the computing system 202 may operate in a networked environment using logical connections to remote network devices through a network 230, such as a wireless network, the Internet, or another type of network. The computing system 202 may connect to the network 230 through a network interface unit 814 connected to the system bus 818. It should be appreciated that the network interface unit 814 may also be utilized to connect to other types of networks and remote computing systems. The computing system 202 also includes an input/output unit 816 for receiving and processing input from a number of other devices, including a touch user interface display screen, or another type of input device. Similarly, the input/output unit 816 may provide output to a touch user interface display screen or other type of output device.

As mentioned briefly above, the mass storage device 826 and the RAM 822 of the computing system 202 can store software instructions and data. The software instructions include an operating system 830 suitable for controlling the operation of the computing system 202. The mass storage device 826 and/or the RAM 822 also store software instructions, that when executed by the CPU 812, cause the computing system 202 to provide the functionality discussed in this document. For example, the mass storage device 826 and/or the RAM 822 can store software instructions that, when executed by the CPU 812, cause the computing system 202 to receive and analyze inventory and demand data.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method for determining a fulfillment retail location, the method comprising:
receiving, at a supply chain quality assessment software tool implemented on a computing system, inputs related to an order comprising an inventory item and a destination location;
receiving a request for delivery of the order;
determining, individually for the inventory item, one or more retail locations having the inventory item in-stock;
in response to determining one or more retail locations having the inventory item in-stock, generating an item location map that provides the one or more retail locations having the inventory item in-stock;
accessing, by the supply chain quality assessment software tool, a transit time database to determine a predicted transit time to transport the inventory item from each of the one or more retail locations to the destination location, wherein the predicted transit time is determined based on a balance of historical transit times and mitigating factors, wherein the transit time database is updated to receive mitigating factor information associated with a current weather condition, a current road condition, or a current traffic condition;
receiving historical reported inventory levels, individually for each inventory item for each of the one or more retail locations, and calculating how often the retail location reports accurate inventory levels of the inventory item to determine inventory accuracy of the one or more retail locations;
determining, by the supply chain quality assessment software tool, individually for the one or more retail locations included in the item location map, a node quality score for each retail location, wherein the node quality score is based historical shipping information, inventory accuracy, and handling performance of a plurality of items at the retail location, and wherein the node quality score is an average of per-item quality scores at each retail location;
generating a shipment location map by determining, individually for each of the one or more retail locations provided on the item location map, whether the node quality score is above a predetermined quality score threshold, wherein the shipment location map includes one or more retail locations from the item location map having a node quality score above the predetermined quality score threshold;
selecting, by the supply chain quality assessment software tool, a retail location from among the one or more retail locations provided on the shipment location map based, at least in part, on a fulfillment cost, the predicted transit time, and the node quality score;
sending a shipping instruction from the supply chain quality assessment software tool to a supply chain fulfillment server, the shipping instruction comprising a handling instruction for the inventory item to the selected retail location to initiate shipment from the selected retail location; and
shipping the inventory item from the selected retail location.

2. The method of claim 1, wherein the historical shipping information comprises factors selected from: how often a location ships items out on time and how often the item is received on time, the cost of previous shipments, and if the least cost shipping option was utilized.

3. The method of claim 1, wherein the handling performance comprises factors selected from: proper packaging of the item, including all items in the order, and shipping high quality items.

4. The method of claim 3, wherein the handling performance further comprises determining a fulfillment cost for a retail location.

5. The method of claim 4, wherein the selected retail location has the lowest fulfillment cost.

6. The method of claim 1, wherein the one or more retail locations comprises a retail store location.

7. The method of claim 1, wherein the one or more retail locations includes a plurality of retail locations associated with a flow center.

8. The method of claim 1, wherein the shipping instruction further includes information regarding the inventory item, destination location, and predetermined period of time.

9. The method of claim 1, wherein the average of the quality score is a weighted average.

10. The method of claim 1, wherein the handling instruction for the inventory item includes instructions as to whether the item needs to be temperature controlled, whether the item contains hazardous material, whether the item is flammable, or whether the item is bulky.

11. The method of claim 1, wherein the order comprises a first inventory item and a second inventory item, the first inventory item and the second inventory item each having a per-item quality score for each of the one or more retail locations, and the node quality score being based on an average of the per-item quality scores for at least the first inventory item and the second inventory item.

12. The method of claim 1, wherein the node quality score is based on an average of per-item quality scores for all inventory items at each of the one or more retail location.

13. A system for facilitating online orders fulfilled from retail locations, the system comprising:
a computing system comprising at least one processor communicatively connected to a memory, the memory storing computer-executable instructions comprising a supply chain quality assessment software tool which, when executed, causes the computing system to:
receive, at the supply chain quality assessment software tool, a request for delivery of the online order comprising an inventory item and a destination location;
determine, individually for the inventory item, one or more retail locations having the inventory item in-stock;
in response to determining one or more retail locations having the inventory item in-stock, generate an item location map that provides the one or more retail locations having the inventory item in-stock;
access, by the supply chain quality assessment software tool, a transit time database to determine a predicted transit time to transport the inventory item from each of the one or more retail locations to the destination location, wherein the predicted transit time is determined based on a balance of historical transit times and mitigating factors, wherein the transit time database is updated to receive mitigating factor information associated with a current weather condition, a current road condition, or a current traffic condition;
receive historical reported inventory levels, individually for each inventory item for each of the one or more retail locations, and calculate how often the retail location reports accurate inventory levels of the inventory item to determine inventory accuracy of the one or more retail locations;
determine, by the supply chain quality assessment software tool, individually for the one or more retail locations included in the item location map, a node quality score for each retail location, wherein the node quality score is based historical shipping information, inventory accuracy, and handling performance of a plurality of items at the retail location, and wherein the node quality score is an average of per-item quality scores at each retail location;
generate a shipment location map by determining, individually for each of the one or more retail locations provided on the item location map, whether the node quality score is above a predetermined quality score threshold, wherein the shipment location map includes one or more retail locations from the item location map having a node quality score above the predetermined quality score threshold;
select, by the supply chain quality assessment software tool, a retail location from among the one or more retail locations provided on the shipment location map based, at least in part, on a fulfillment cost, the predicted transit time, and the node quality score;
transmit a shipping instruction from the supply chain quality assessment software tool to a supply chain fulfillment server, the shipping instruction comprising a handling instruction for the inventory item to the selected retail location to initiate shipment from the selected retail location; and
ship the inventory item from the selected retail location.

14. The system of claim 13, wherein the historical shipping information comprises factors selected from how often a location ships items out on time and how often the item is received on time, the cost of previous shipments, and if the least cost shipping option was utilized.

15. The system of claim 13, wherein the handling performance comprises factors selected from proper packaging of the item, including all items in the order, and shipping high quality items.

16. The system of claim 15, wherein the handling performance further comprises determining a fulfillment cost for a retail location.

17. The system of claim 16, wherein the selected retail location has the lowest fulfillment cost.

18. The system of claim 13, wherein the computing system comprises a quality assessment server, wherein the quality assessment server evaluates the historical shipping information, the inventory accuracy, and the handling performance.

19. The system of claim 13, wherein the shipping instruction further includes information regarding the inventory item, destination location, and predetermined period of time.

20. The system of claim 13, wherein the handling instruction for the inventory item includes instructions as to whether the item needs to be temperature controlled, whether the item contains hazardous material, whether the item is flammable, or whether the item is bulky.

21. A retail web server configured for facilitating online orders fulfilled from retail locations, the system comprising:
a computing system comprising at least one processor communicatively connected to a memory, the memory storing computer-executable instructions comprising a software tool which, when executed causes the system to:
provide a retail user interface from an online retailer, the retail user interface including a plurality of selectable items available for delivery to a user;
receive, from a user device, a selection of an item from among the plurality of selectable items and a destination location for delivery of the item within a predetermined period of time;

transmit the selection of the item and the destination location to a delivery management system comprising a quality assessment server;

determine, individually for the inventory item, one or more retail locations having the inventory item in-stock;

in response to determining one or more retail locations having the inventory item in-stock, generate an item location map that provides the one or more retail locations having the inventory item in-stock;

access a transit time database to determine a predicted transit time to transport the inventory item from each of the one or more retail locations to the destination location, wherein the predicted transit time is determined based on a balance of historical transit times and mitigating factors, wherein the transit time database is updated to receive mitigating factor information associated with a current weather condition, a current road condition, or a current traffic condition;

receive historical reported inventory levels, individually for each inventory item for each of the one or more retail locations, and calculate how often the retail location reports accurate inventory levels of the inventory item to determine inventory accuracy of the one or more retail locations;

receive, from the quality assessment server, a node quality score for each individual retail location, wherein the node quality score is based historical shipping information, inventory accuracy, and handling performance of a plurality of items at the retail location, and wherein the node quality score is an average of per-item quality scores at each retail location;

based on the node quality score being below a predetermined quality score threshold, not selecting the retail location to ship the inventory item to add to a shipment location map; and based on the node quality score being above a predetermined quality score threshold, adding at least one retail location to the shipment location map;

selecting, at the quality assessment server, a retail location from among the one or more retail locations on the shipment location map based, at least in part, on a fulfillment cost, the predicted transit time, and the node quality score, transmit, from the quality assessment server to a supply chain fulfillment server, the shipping instruction, the shipping instruction comprising a handling instruction for the inventory item to the selected retail location to initiate shipment from the selected retail location; and ship the inventory item from the retail location.

22. The system of claim 21, wherein the computing system comprises a quality assessment server, wherein the quality assessment server evaluates the historical shipping information, the inventory accuracy, and the handling performance.

* * * * *